United States Patent [19]
Jones et al.

[11] 3,879,281
[45] Apr. 22, 1975

[54] FLUID CATALYTIC CRACKING

[75] Inventors: Henry B. Jones; Dorrance P. Bunn, Jr., both of Houston, Tex.

[73] Assignee: Texaco Inc., New York, N.Y.

[22] Filed: Dec. 20, 1973

[21] Appl. No.: 426,888

Related U.S. Application Data

[62] Division of Ser. No. 276,619, July 31, 1972, Pat. No. 3,826,624.

[52] U.S. Cl. ............................................... 208/164
[51] Int. Cl. ........................................... C10g 13/18
[58] Field of Search .................... 208/164; 23/288 S

[56] References Cited
UNITED STATES PATENTS

| | | | |
|---|---|---|---|
| 2,601,676 | 6/1952 | Trainer et al. | 208/164 |
| 2,726,197 | 12/1955 | Ewell | 208/164 |
| 3,619,415 | 11/1971 | Jones et al. | 23/288 S |
| 3,687,841 | 8/1972 | Saxton et al. | 23/288 S |

*Primary Examiner*—Herbert Levine
*Attorney, Agent, or Firm*—Thomas H. Whaley; Carl G. Ries

[57] ABSTRACT

A fluid catalytic cracking unit wherein the reaction zone comprises one or more risers and a reaction vessel; wherein catalyst and oil vapors continually discharge from the risers into the reaction vessel; and wherein the reaction vessel is in communication with a stripping zone such that spent catalyst flows into the stripping zone. In operation, a selected inventory of catalyst is maintained in a fluidized state in the reaction vessel. Such selected catalyst inventory in the reactor vessel is maintained by means responsive to the pressure differential between the stripping zone and the reactor vessel. Means are also provided for controlling such pressure differential and thereby adjusting catalyst inventory in the reactor vessel.

3 Claims, 2 Drawing Figures

FLUID CATALYTIC CRACKING

This is a division of application Ser. No. 276,619, filed July 31, 1972, now U.S. Pat. No. 3,826,624.

The invention of the present application is related to the invention disclosed in U.S. Patent application Ser. No. 182,030, filed Sept. 20, 1971 now U.S. Pat. No. 3,784,360.

BACKGROUND OF THE INVENTION

This invention relates to a method and apparatus for fluid catalytic cracking of hydrocarbon oils. More particularly, this invention relates to a method for maintaining a selected catalyst inventory within a reaction zone and to apparatus for maintaining such catalyst inventory.

In a fluid catalytic cracking process, hydrocarbon oils are reacted in the presence of a catalyst under conditions such that a portion of the hydrocarbon oils are converted to desired products. During the hydrocarbon conversion, coke is deposited upon the catalyst. Catalyst contaminated with coke is removed from the reaction zone from which it may be transferred to a stripping zone. In the stripping zone, occluded hydrocarbons are removed from the catalyst employing a stripping vapor such as, for example, steam. The stripping vapors and volatilized hydrocarbons are transferred from the stripping zone into the reaction zone from which they are subsequently recovered as components of the reaction zone hydrocarbon effluent, stripped catalyst from the stripping zone is transferred to a regeneration zone wherein at least a portion of the coke is removed by contacting said stripped catalyst with an oxygen containing gas which causes combustion of the coke and regeneration of the catalyst. Regenerated catalyst is mixed with additional hydrocarbon oil to be converted in the reaction zone.

According to one method for converting hydrocarbons, regenerated catalyst and hydrocarbon vapors are combined near the bottom of a riser under reaction conditions. The catalyst-hydrocarbon mixture flows upward in the riser and is subsequently discharged into a reacion vessel. In the reaction vessel, hydrocarbon vapors are separated from the catalyst. In this method of cracking hydrocarbon oils, one or more risers may be employed. For instance, in U.S. Pat. No. 3,619,415 fluid catalytic cracking methods are described wherein two risers are employed. In the first riser, fresh hydrocarbon oil feed is combined with regenerated catalyst for reaction therein. In the second riser, recycle oil, comprising relatively high boiling components obtained from the cracked hydrocarbon product of the catalytic cracking reaction, is combined with regenerated catalyst and subjected to an additional cracking reaction.

In the reaction vessel, a bed of catalyst is maintained in a fluidized state by the passage of vapors therethrough. The fluidized catalyst bed segregates itself into a lower dense phase wherein the density of the catalyst bed is from about 0.5 to about 0.9 times the bulk density of the unfluidized catalyst, and into a dilute phase which has a solids concentration of only about 0.1 to 0.3 lbs. per cubic foot. Hydrocarbon vapors entering the reaction zone via the riser or risers provide a substantial proportion of the vapors required to maintain the catalyst bed in a fluidized state. Additional vapors may comprise primary stripping steam near the bottom of the dense phase which may be added for the purposes of separating a portion of the occluded hydrocarbons from the catalyst and maintaining the dense phase in a fluidized state.

Catalyst is continuously discharged from the risers into the reaction vessel, and catalyst is continuously withdrawn from the dense phase in order to maintain a desired catalyst inventory within the reaction vessel. The rate at which catalyst enters the reaction zone is a function of two separately controlled reaction variables; the ratio of catalyst to hydrocarbon in the reaction mixture and the flow rate of hydrocarbon oil in the risers. Therefore, the rate at which catalyst enters the reaction vessel depends upon the selected ratio of catalyst ot hydrocrabon and also upon the flow rate of hydrocarbon in the risers. In order to maintain a selected inventory of fluidized catalyst in the reaction vessel, it is necessary to withdraw catalyst form the dense phase at substantially the same rate at which catalyst enters the reaction vessel via the risers. According to one method of the prior art, the inventory of catalyst within the reaction vessel is maintained at a selected value by measuring a pressure differential between a point near the bottom of the dense phase and a point above the dense phase and controlling the rate at which catalyst is withdrawn from the dense phase to maintain the measured pressure differential at a preselected value. This method for controlling the catalyst inventory is accomplished by installing a pressure tap in the reaction vessel near the bottom of the dense phase and installing a pressure tap in the reaction vessel in the dilute phase. These pressure taps are connected to a differential pressure transmitter with piping or tubing. The differential pressure transmitter provides an output signal proportional to the difference in pressure between the lower tap and the upper tap. The output signal from the differential pressure transmitter is supplied to a control instrument which compares the measured differential pressure with a preselected set point value. Should the measured differential pressure vary from the set point, the control instrument supplies a signal to a valve actuator which is connected to a slide valve installed in a dense phase catalyst drawoff means. The valve actuator responds to the signal from the control instrument by adjusting the position of the slide valve. Thus, the rate at which dense phase catalyst is removed from the reaction vessel is varied in order to maintain the selected differential pressure across the fluidized catalyst bed. Since the differential pressure across the dense phase bed is proportional to the catalyst inventory in the dense phase bed, control of the differential pressure results in control of the catalyst inventory.

In a fluidized catalytic cracking process such as described above a major portion of cracking reaction may occur in the risers and a minor portion of the cracking reaction may occur in the reaction vessel. Control of the cracking reaction may be maintained to give a desired range of cracked hydrocarbon products by varying reaction variables such as hydrocarbon space velocity in the riser, reaction temperature, and the catalyst to oil ratio. Additional process control can be obtained by varying the depth of the dense phase catalyst bed present in the reaction vessel. As the risers discharge into the reaction vessel at selected elevations, more or less contact of hydrocarbon with the catalyst in the dense phase bed bed may be obtained by raising or lowering the dense phase bed level. In processes employing multiple risers, each transferring hydrocarbons with differing cracking characteristics, it may be desirable under certain conditions that a less refractory stock discharge from a riser above the bed and under other conditions that effluent from such riser discharge into the bed for additional cracking. The dense phase bed level may be raised or lowered to accommodate discharge of a cracking stock either above or within the dense phase bed, as desired.

Catalyst removed from the dense phase in the reaction vessel has coke deposited upon it which adversely affects its catalytic activity. Also, even where primary stripping is provided in the reaction vessel, such dense phase catalyst has appreciable amounts of relatively high boiling hydrocarbon liquids occluded thereon. Catalyst removed from the reaction vessel is passed into a regeneration zone wherein coke and any other combustible materials are removed by combustion with an oxygen containing gas such as air. The removal of coke and other combustibles from the catalyst restores its catalytic activity thereby making it suitable for further use in the fluidized catalytic cracking process. Rather than burning, and thereby losing heavy oils occluded upon catalyst withdrawn from the reaction vessel a substantial proportion of such occluded oil may be recovered by stripping the withdrawn catalyst with a stripping vapor prior to passing such catalyst to the regneration zone. Accordingly, catalyst withdrawn from the reaction vessel may be passed through a secondary stripping zone wherein it is intimately contacted with a stripping vapor, preferably steam. A major portion of the occluded liquid hydrocarbons are thereby vaporized and stripped from the catalyst. The secondary stripping vapor and vaporized hydrocarbons may conveniently be passed into the reaction vessel at a point above the fluidized catalyst bed via a stripper vent line. By employing this means for disposing of the stripping vapors and vaporized hydrocarbon, the vaporized hydrocarbon may be conveniently recovered along with the hydrocarbon product from the reaction vessel. Additionally, by providing communication from the secondary stripping zone into the reaction vessel above the fluidized catalyst bed, a pressure differential between the reaction vessel and the secondary stripping zone may be maintained proportional to the pressure drop through the stripper vent line. This pressure drop is small and in the prior art is controlled by properly sizing the cross section area of the stripping vent line. The pressure differential between the reaction zone and the secondary stripping zone is commonly of a small value, such that transfer of catalyst from the reaction vessel into the secondary stripping zone is not complicated by large differences in pressure between the two zones.

SUMMARY OF THE INVENTION

Now, according to the method of the present invention, a fluidized catalytic cracking process is provided wherein a selected inventory of catalyst is maintained in the reaction vessel, wherein catalyst is removed from the reaction vessel at a rate equal to the rate at which catalyst is added to said reaction vessel and wherein catalyst removed from the reaction zone is regenerated and recycled for further use in the process. More particularly, an improved apparatus is provided for maintaining the inventory of fluidized catalyst within the reaction zone at a selected level and controlling the rate at which such catalyst is withdrawn from the reaction zone at a rate equivalent to that at which catalyst enters said reaction zone.

By employing the present invention, the static head exerted by the dense phase catalyst bed may be utilized for circulating catalyst between the stripping zone and the regenerator, rather than being expended across a catalyst slide valve. Also, erosion of internal parts by inpinging high velocity catalyst is reduced since pressure differential between the reactor and stripping zone is controlled by throttling a relatibely nonerosive vapor stream rather than an erosive catalyst stream. These, and other advantages will be more fully described in the detailed description of the invention which follows.

DETAILED DESCRIPTION OF THE INVENTION

Figure 1:
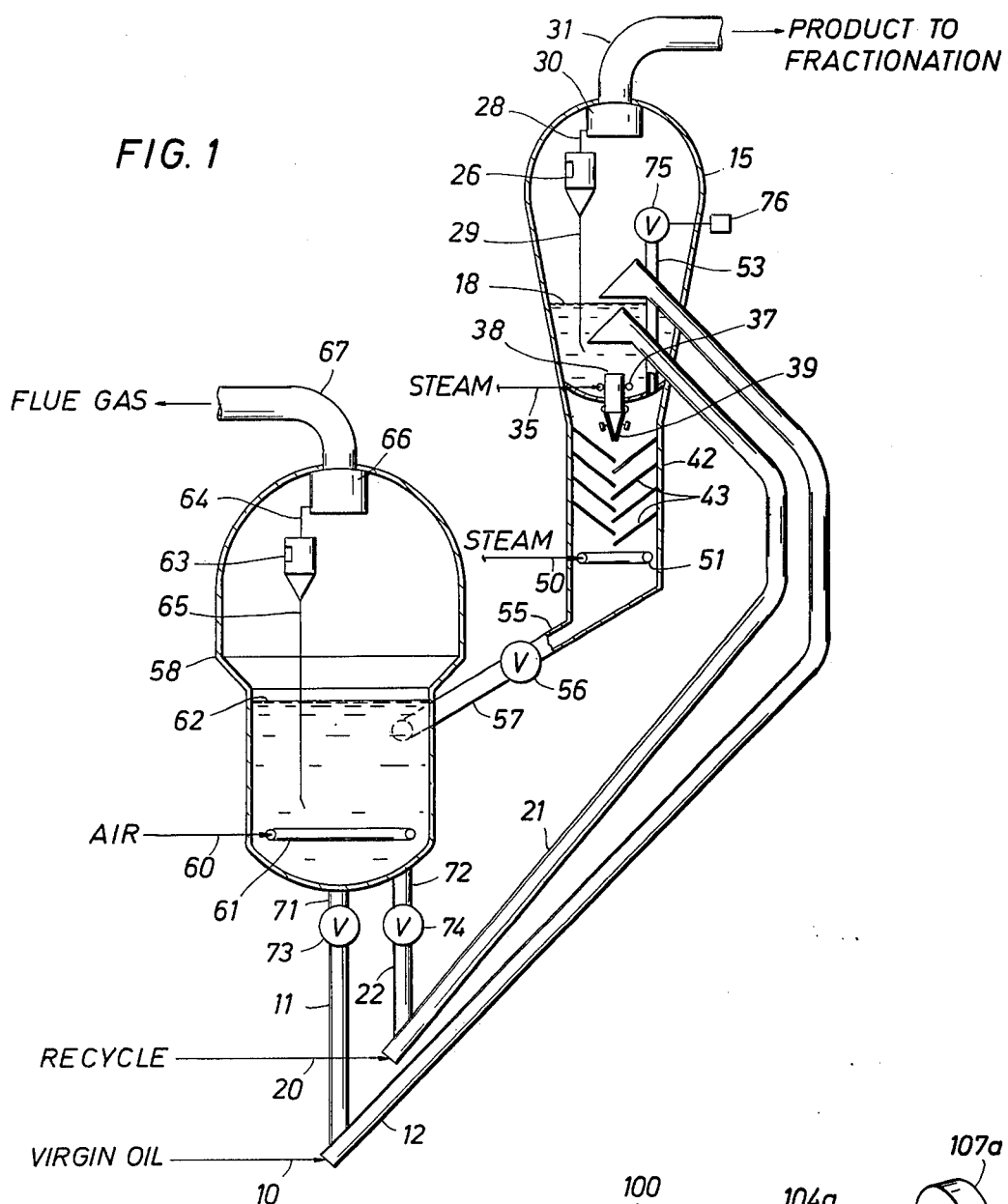
FIG. 1 of the drawings is a schematic diagram of a fluidized catalytic cracking process employing the improvement of the present invention.

It is known that recycle stocks such as cycle gas-oil separated from fluid catalytic cracking products are more refractory than virgin charge stocks. Preferably, these refractory recycle stocks are cracked under more severe conditions than virgin stocks. It is also known that a short period of good contact between a charge stock and cracking catalyst results in superior yields as compared to a longer period of poor contact. Accordingly, fluid catalytic cracking processes have been devised wherein virgin charge stock to the process may be reacted under one set of conditions and recycle charge stock to the process reacted under more severe conditions. Various apparatus configurations have been proposed for obtaining different cracking conditions for virgin charge stock and for recycle charge stock and to achieve more intimate catalyst-oil contact. In one configuration catalyst and virgin charge stock are charged to a first riser and effluent from said first riser is discharged into a reactor vessel at an intermediate point. Catalyst and recycle hydrocarbon are charged into a second riser and the recycle hydrocarbon-catalyst mixture is discharged from the second riser into the reactor vessel below the discharge point of the virgin charge stock riser. A bed level of fluidized cracking catalyst maintained in the reaction vessel may be selected such that the recycle stock has appreciably longer contact with cracking catalyst. Thus, the recycle stock is subjected to relatively more severe cracking conditions than the virgin stock. Under different situations if may be desirable to change the cracking severity employed for cracking virgin stock, the recycle stock or both. For instance, with changing yearly seasons the market demand for gasoline and heating oil varies. Different proportions of these products may be made by varying cracking severity. Also, dfferent charge stocks may be employed from time to time which require different cracking conditions to produce the desired products. One means for changing cracking severity is by increasing or decreasing contact time of hydrocarbon with the catalyst. Such contact time may be conveniently varied by increasing or decreasing the depth of fluidized bed through which such hydrocarbon must pass in the reactor vessel.

When operating a fluid catalytic cracking process wherein a dense phase bed of catalyst is maintained in a reaction vessel, it has been found that the catalyst inventory in the reaction vessel is altered upon changing the depth of the dense phase bed. Uncontrolled changes in the depth of the dense phase bed may lead to undesirable consequences. For example, if the dense phase bed inventory increases, the virgin charge stock riser outlet may become submerged in the dense phase, thereby increasing contact time of the virgin charge stock with catalyst and resulting in decreased yields of desirable cracked products. On the other hand, if the dense phase bed inventory is decreased too much, the recycle charge stock discharging into the reaction vessel may not have sufficient contact time with the catalyst to obtain proper cracking. Therefore, in one embodiment of the invention means are provided here for preselecting a minimum catalyst bed level and for controlling the depth of the dense phase bed above the minimum level. The minimum bed level may be selected to ensure that the lower riser discharge is not uncovered by the dense phase bed, or, if desired, may be selected substantially below such lower riser discharge.

According to the method of the present invention an improved catalytic cracking process is disclosed wherein a selected catalyst inventory within a reactor vessel is maintained employing improved means for transferring catalyst from the reactor vessel to a secondary stripping zone and for transferring stripping vapor and stripped hydrocarbon from the stripping zone into the reactor vessel. The method of the present invention may be better understood by reference to FIG. 1 of the drawing, which figure illustrates one embodiment by which the method of the present invention may be practiced. It is not intended to restrict the invention by said FIG. 1, since modifications may be made within the scope of the claims without departing from the spirit thereof.

Referring to FIG. 1 of the drawing, a virgin gas oil in line 10 is contacted with hot regenerated catalyst from standpipe 11 at a temperature of about 1200 °F. in the inlet portion of a fresh feed riser 12. The resulting suspension of catalyst in oil vapor at a temperature of about 920°F. and at an average velocity of about 33 feet per second passes upward through fresh feed riser 12 and into reactor vessel 15. Fresh feed riser 12 terminates in a downwardly directed outlet. Conditions prevailing in the fresh feed riser include a catalyst to oil weight ratio of 5.6 and a weight hourly space velocity of 69.5. The vapor velocity in the fresh feed riser 12 is about 40 feet per second providing a residence time of about 4.0 seconds. Substantial conversion of fresh feed occurs in the riser and at these conditions amounts to a conversion of 32 weight percent of the fresh feed into product boiling below 430°F.

A heavy cycle gas oil fraction, separated from the cracked product in fractionation equipment, not shown, having a gravity of about 22° API and an end point temperature of about 725°F. is introduced through line 20 into the inlet section of a recycle riser 21 wherein it is contacted with hot catalyst from standpipe 22. The resulting catalyst recycle oil vapor mixture at a temperature of about 920°F. passes upward through recycle riser 21 at an average velocity of about 28 feet per second with an average residence time of about 5.0 seconds. Other conditions in recycle riser 21 include a catalyst to oil weight ratio of 6.2 and a weight hourly space velocity of 51.8. About 16 percent of the gas oil recycle is converted to products boiling below 430°F. by the time the products are discharged through the outlet of recycle riser 21 into the lower portion of the reactor vessel 15. The hydrocarbon vapor effluent of recycle riser 21 passes upwardly through a dense phase catalyst bed in reactor 15 effecting further conversion of the recycle gas oil into 39 percent products boiling below 430°F. Other conditions in the dense phase bed in reactor 15 include a catalyst to oil weight ratio of 12.3 and a weight hourly space velocity of 3.0. The combined fresh feed riser cracking, recycle riser cracking and reactor bed cracking provide an overall conversion of 70 volume percent of fresh feed into products boiling below 430°F. The vapor velocities in reactor vessel 15 are 1.7 feet per second at the point at which recycle riser 21 discharges, 3.1 feet per second at the point where the fresh feed riser 12 discharges and 1.5 feet per second in the upper portion of reactor vessel 15.

Cracked product vapors disengage from the catalyst dense phase bed at level 18. The level 18 of the dense phase bed is maintained below the discharge of the fresh feed riser 12 thereby allowing cracked fresh feed vapors to disengage the catalyst without an extended catalyst contact time which would result from passing such vapors through the dense phase bed. The desired level 18 of the dense phase bed is maintained by adjusting the catalyst inventory within reactor vessel 15 and controlling the catalyst fluidization vapor velocity through said dense phase bed, as will hereinafter be further described.

The vapors and entrained catalyst passing upward through reactor vessel 15 enter cyclone 26 wherein entrained catalyst is separated from the vapors and returned to the catalyst bed through dip leg 29. Although a single cyclone is shown for clarity, it will be understood that several cyclones may be assembled in series to achieve substantially complete separation and a plurality of such assemblies may be employed to handle the volume of vapor encountered. Effluent vapors pass from cyclone 26 through line 28 into plenum chamber 30. From plenum chamber 30, vapors are discharged from reactor vessel 15 through line 31. Vapor line 31 conveys the hydrocarbon vapors to a fractional distillation zone, not shown, wherein the vapors are separated into desired products and recycle steams by methods known in the art.

Steam in line 35 is passed to steam ring 37 and discharges near the bottom of reactor vessel 15 at a point just below the inlet of catalyst withdrawal standpipe 38. Steam discharged from steam ring 37 and recycle vapors discharged from recycle riser 21 provide vapors to maintain the dense phase catalyst bed in a fluidized state. At a selected recycle hydrocarbon vapor rate, level 18 of the dense phase catalyst bed, as hereinabove described, may be adjusted while maintaining a constant catalyst inventory in reactor vessel 15 by adjusting the rate of steam discharge through steam ring 37. Variation of the primary stripping steam increases or decreases the bulk density of the dense phase catalyst bed in reactor vessel 15. At a constant catalyst inventory the bed level 18 will rise as the bulk density of the dense phase catalyst bed is decreased upon increasing the addition of primary stripping steam via steam ring 37.

Dense phase catalyst in the lower portion of reactor 15 passes downwardly through standpipe 38 and counter weighted check valve 39 into stripping zone 42. Catalyst valve 39, shown in more detail in FIG. 2 of the drawings, is equipped with counter weights arranged to exert a closing force upon the valve. The weight of catalyst collected in standpipe 38 and in the dense phase bed exert an opening force upon catalyst valve 39. In the operation of a fluidized catalyst cracking process, the inventory of catalyst is discharged from risers 12 and 21 into reactor vessel 15 will increase the head of catalyst above catalyst valve 39 overcomes the closing force exerted by the counter weights and the pressure differential between stripping zone 42 and reactor vessel 15. When the static head of catalyst balances the force of the counter weights and the pressure differential, additional catalyst added to reactor vessel 15 will cause catalyst valve 39 to open and allow catalyst to pass from reaction vessel 15 to stripping zone 42, thereby restoring balance between the head of catalyst above catalyst valve 39 and the closing forces. In the operation of a fluidized catalytic cracking process wherein catalyst is continuously entering reaction vessel 15, catalyst valve 39 continuously passes catalyst from reaction vessel 15 to stripping zone 42 to maintain a selected catalyst inventory in the reactor vessel 15.

Baffels 43 are attached to the wall of said stripping zone 42. Steam in line 50 is discharged through steam ring 51 into the lower portion of stripping zone 42 below the baffles 43. Steam rising through stripping zone 42 vaporizes and separates occluded and entrained hydrocarbons from the catalyst entering stripping zone 42 via catalyst valve 39. Steam and vaporized hydrocarbons pass upwardly from stripping zone 42 through stripper vent line 53 and valve 75, discharging into the upper portion of reactor vessel 15, above the fluidized catalyst dense phase level.

The differential pressure between reactor vessel 15 and stripping zone 42 amounts to the pressure drop of steam and stripped hydrocarbons flowing through stripper vent line 53 and valve 75. Bed level 18 of fluidized catalyst in reactor vessel 15 remains such that the head of catalyst above catalyst valve 39 is sufficient to overcome the force exerted by the counter weights and the pressure differential between reactor vessel 15 and stripping zone 42. A minimum bed level 18 may be established by selecting counter weights for catalyst valve 39 and sizing stripper vent line 53 such that pressure drop therethrough is very small when valve 75 is fully open. In operation, bed level 18 may be increased by partially closing valve 75, employing valve motor 76, such that the pressure differential between stripping zone 42 and reactor vessel 15 increases. As the pressure differential increases, the head of catalyst required to open catalyst valve 39 increases. Consequently, the catalyst inventory in reaction vessel 15 increases until the head of catalyst is again sufficient to open catalyst valve 39. Upon an increase in catalyst inventory in reactor vessel 15, the dense phase bed level 18 will rise such that recycle hydrocarbon vapors discharging from recycle riser 21 are subjected to additional contact with the dense phase catalyst bed, thereby increasing conversion of recycle hydrocarbon into hydrocarbons boiling 430°F.

As hereinabove described, the dense phase bed level is mainly controlled by operation of valve 75. Some small, additional control of the dense phase bed level 18 may be obtained by adjusting the primary stripping steam rate to affect the dense phase bulk density. That is, for a given catalyst inventory in reactor vessel 15, the dense phase bed level 18 varies inversely with the bulk density of the fluidized dense phase bed. However, such considerations as stripping hydrocarbons from the catalyst and maintaining proper fluidization of the dense phase bed are generally more important in determining the primary stripping steam rate.

Valve 75 is suitable for controlling the flow of vapors at relatively high temperatures. For instance, the design of valve 75 may be selected from butterfly valves, slide valves, and other valves suitable for controlling vapor flow. Preferably, a butterly valve design is employed for valve 75.

Stripped catalyst from the bottom of stripping zone 42 passes through a spent catalyst standpipe 55 at a rate controlled by stripped catalyst slide valve 56 and discharges through standpipe 57 into regenerator 58. In regenerator 58, spent catalyst is contacted with air introduced through line 60 and air ring 61 whereupon coke is burned and spent catalyst is regenerated. Catalyst undergoing regeneration in regenerator 58 forms a dense phase bed having a levl 62. Flue gas resulting from coke burned from the catalyst passes upwardly through regenerator 58 and enters cyclone 63 wherein entrained catalyst is separated from the flue gas and is returned to the regenerator dense phase bed through dip leg 65. Cyclone 63, although represented as a single vessel may, of course, comprise an assembly of cyclones arranged in parallel and in series to effect substantially complete separation of entrained solids from flue gas. Effluent flue gas from cyclone 63 passes through line 64 into plenum chamber 66. From plenum chamber 66 flue gas exits regenerator vessel 58 through flue gas line 67 to vent facilities, not shown.

Regenerated catalyst is withdrawn from the bottom of regenerator 58 through line 71 and 72 at rates controlled by slide valves 73 and 74 to supply hot regenerated catalyst to standpipes 22 and 11 as described above.

Figure 2:
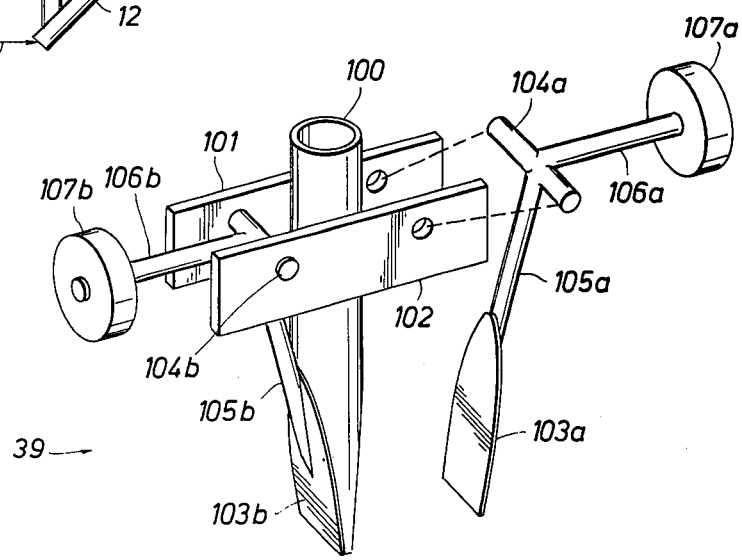
FIG. 2 of the drawing is a schematic drawing in cross section showing in more detail a portion of the system of FIG. 1.

FIG. 2 of the drawings illustrates, in detail, one design for catalyst valve 39 which may be employed in the practice of present invention. The valve design shown in FIG. 2 for valve 39 is not intended to restrict the invention thereby, since variations and modifications may be made within the scope of the claims without departing from the spirit thereof.

In FIG. 2, catalyst valve 39 is shown in an isometric view with one closure element for said valve shown in exploded view for clarity and the other closure element shown in a normal relationship to the remaining elements of the catalyst valve.

Referring now to FIG. 2 of the drawing, a valve body 100 comprising vertically disposed pipe having an open upper and and a lower end is attached to parallel support members 101 and 102. The upper end of valve body 100 extends above support members 101 and 102 and the lower end of valve body 100 extends below said support members 101 and 102. The lower end of valve body 100 is cut such that the lower end of said valve body 100 defines two semi-elliptical spaces in allochiral relationship. Flapper vanes 103A and 103B comprising elliptical sections are located such that when said vanes 103A and 103B are in a closed position the semi-elliptical spaces defined by valve body 100 are completely covered. For clarity of detail flapper vane 103A is shown in an exploded view and flapper vane 103B is shown in a closed position. Support members 101 and 102, in a parallel relation comprise vertically disposed plates separated by the width of valve body 100. Support plate 101 has two holes in horizontal alignment symmetrically disposed upon either side of the valve body 100 and support plate 102 has two similar holes in axial alignment with the holes in support plate 101. Bearing rod 104A extending through axially aligned holes is pivotally mounted between support plates 101 and 102 upon one side of valve body 100 and bearing rod 104B extending through axially aligned holes is pivotally supported between support members 101 and 102 upon the other side of valve body 100. Connecting member 105A, attached to bearing rod 104A at a 90° angle extends downwardly and flapper vane 103A is attached thereto. Connecting member 106A is attached to bearing rod 104A at a 90° angle and is angularly disposed to connecting member 105A. A weight 107A is attached to connecting member 106A at a distance from bearing rod 104A. Weight 107A is disposed in relation to flapper vane 103A in such manner that a rotational torque force is imposed upon flapper vane 103A. The rotational torque forces flapper vane 103A against valve 100 thereby covering the semi-elliptical section formed by the lower part of the valve body 100.

As hereinbefore stated, flapper vane 103B is an allochrial analogue of flapper vane 103A. By the same token, connecting member 105B, bearing rod 104B, connecting member 106B, and weight 107B are the allochrial analogues of connecting member 105A, bearing rod 104A, connecting member 106A, and weight 107A respectively. It is to be understood that flapper vane 103B operates in a manner analogous to the operation of flapper 103A.

In a fluidized cracking process wherein a valve such as shown in FIG. 2 and described above is installed for passing catalyst from the reactor vessel 15 into the stripping zone 42, the inventory of catalyst in reactor vessel 15 exerts a pressure inside valve body 100 against flapper vanes 103A and 103B. The torque force imposed upon the flapper vanes by weights 107A and 107B opposes the pressure imposed by the catalyst. At equilibrium, an increase in catalyst inventory in reactor vessel 15 will create a pressure inside valve body 100 sufficient to overcome the torque force imposed by the weights and the differential pressure between stripping zone 42 and reactor vessel 15. Thus, flapper vanes 103A and 103B will be forced away from the valve body 100 and catalyst will pass from reactor vessel 15 through valve body 100 into stripping zone 42. Sufficient catalyst wil pass through valve body 100 to reduce the catalyst inventory within reactor vessel 15 until torque force imposed by weight 107A closes flapper vanes 103A and 103B.

Under actual operating conditions in a fluidized catalytic cracking process wherein catalyst is continually discharging into reactor vessel 15, pressure exerted by the catalyst inventory will keep flapper vanes 103A and 103B continuously pushed away from the valve body 100 thereby allowing a continuous flow of catalyst from reactor vessel 15 into stripping zone 42. The torque force provided by the weights acts in opposition to the pressure exerted by the catalyst inventory such that the flapper vanes are maintained in a position such that the flow of catalyst through valve body 100 is limited to the amount of catalyst entering reaction vessel 15. By selecting the length of connecting members 106A and 106B and weights 107A and 107B, a torque force of known value may be imposed upon flapper vanes 103A and 103B. This known torque will then support a certain pressure exerted by the catalyst inventory upon the flapper vanes. Thus, by properly selecting the length of the connecting members 106A and 106B, and weights 107A and 107B a torque force may be provided which is sufficient to support the desired minimum catalyst inventory in reaction vessel 15 at a minimum pressure differential between stripping zone 42 and reactor vessel 15. Increasing the pressure differential between stripping zone 42 and reactor vessel 15, by adjusting valve 75 will allow the catalyst inventory in reactor vessel 15 to increase until pressure exerted by such catalyst inventory is sufficient to open vanes 103A and 103B. Thus, by properly selecting weights 107A and 107B and connecting members 106A and 106B, a minimum catalyst inventory may be established for reactor vessel 15, and by properly adjusting valve 75, the catalyst level 18 may be increased as desired to provide improved process operating conditions.

From the foregoing disclosure and drawings an improved process and apparatus are shown for maintaining a selected catalyst inventory in a fluid catalytic cracking reaction vessel. Many variations and modifications will appear obvious to those skilled in the art. All such variations and modifications are to be included in the present invention, and no limitations are intended except those included within the appended claims.

We claim:

1. In a fluidized catalytic cracking process comprising a riser zone, a reaction vessel, a stripping zone vertically mounted below said reaction zone, and a regeneration zone wherein regenerated catalyst from said regeneration zone is contacted at cracking conditions with hydrocarbon oil charge in said riser zone, wherein catalyst and hydrocarbon vapors are disengaged in said reaction vessel, wherein a fluidized bed of catalyst is maintained in said reaction vessel, wherein catalyst from said fluidized bed is withdrawn into the upper portion of said stripping zone, wherein stripping vapors are introduced into the lower portion of said stripping zone, wherein stripping vapors and stripped hdyrocarbons are vented from the top of the stripping zone into the upper portion of said reaction vessel above the surface of the fluidized catalyst bed, and wherein stripped catalyst from the bottom of the stripping zone is withdrawn into the regeneration zone; the improvement which comprises:
   a. restricting flow of stripping vapors and stripped hydrocarbon from said stripping zone to said reactor to maintain a selected differential pressure between the top of stripping zone and the upper portion of the reaction vessel;
   b. accumulating a bed of fluidized catalyst in the reaction vessel sufficient to provide a weight of fluidized catalyst equivalent to the pressure differential between the top of the stripping zone and the upper portion of the reaction vessel; and
   c. flowing catalyst from the bottom of said fluidized bed into upper portion of said stripping zone at a rate sufficient to maintain the volume of fluidized bed of step (b).

2. The process of claim 1 wherein the time average catalyst flow from the bottom of said fluidized bed into the stripping zone is substantially equal to the time average flow of catalyst into the reaction vessel.

3. The process of claim 2 wherein the accumulation of catalyst in the reaction vessel fluidized bed is adjusted by adjusting the flow of stripping vapor and stripped hydrocarbon from the stripping zone into the upper portion of the reaction vessel.

* * * * *